United States Patent [19]

Edinger

[11] Patent Number: 4,478,345

[45] Date of Patent: Oct. 23, 1984

[54] SELF-CONTAINED CONTAINMENT FOR GAS CYLINDER

[76] Inventor: William J. Edinger, Basin #3, Clipper Yacht Harbor, Sausalito, Calif. 94965

[21] Appl. No.: 508,116

[22] Filed: Jun. 27, 1983

[51] Int. Cl.³ ........................ B65D 8/22; B65D 25/20; F16J 13/02

[52] U.S. Cl. .................................. 220/85 P; 137/382; 137/588; 220/5 A; 220/85 V; 220/320

[58] Field of Search ................. 220/85 P, 85 S, 85 V, 220/319, 320, 321, 5 A, 86 R; 137/382, 587, 588

[56] References Cited

U.S. PATENT DOCUMENTS

| | | | |
|---|---|---|---|
| 307,608 | 11/1884 | Wheelwright | 220/5 A |
| 420,275 | 1/1890 | Keys | 220/5 A |
| 1,977,268 | 10/1934 | Endacott | 220/86 R X |
| 2,465,095 | 3/1949 | Harvey | 220/85 P X |
| 3,006,360 | 10/1961 | Oxenham | 137/382 |
| 3,185,336 | 5/1965 | Goss | 220/85 P X |
| 3,790,020 | 2/1974 | Fine | 220/319 |
| 4,267,940 | 5/1981 | Wade | 220/320 X |

FOREIGN PATENT DOCUMENTS

| | | | |
|---|---|---|---|
| WO80/01831 | 9/1980 | PCT Int'l Appl. | 220/319 |

*Primary Examiner*—Allan N. Shoap

*Attorney, Agent, or Firm*—Melvin R. Stidham

[57] ABSTRACT

A self-containment for a gas cylinder comprising a coaxial annular wall welded to and around the top of the cylinder itself. A circular closure with an exhaust duct opening from it fits over the annular wall and is secured tightly to it with a seal ring between, by a releasable tension band.

3 Claims, 2 Drawing Figures

SELF-CONTAINED CONTAINMENT FOR GAS CYLINDER

BACKGROUND OF THE INVENTION

Liquified gas in cylinders or "bottles" is commonly used on mobile homes, recreational vehicles and boats as a source of fuel gas for heating and cooking. Where liquid petroleum gas is required on boats, there is usually provided some sort of metal, gas-tight box or the like in which the gas cylinder must be kept to prevent escape of gases within the vessel. Then, an exhaust or vent duct must be provided to extend outside of the boat above the waterline. Since the venting system relies on gravity the gas bottle must also be above the waterline and, on many vessels there are few convenient places to locate the gas-tight box. It would be highly desirable to have a containment system that could by design be placed anywhere aboard the vessel or vehicle without requiring a special bin or other enclosure.

OBJECTS OF THE INVENTION

It is an object of this invention to provide a containment for a liquid gas bottle that is easy to handle and integral with the bottle itself.

It is a further object of this invention to provide a containment for a liquid gas bottle that is compact and adapted for placement adjacent a gas appliance.

Other objects and advantages of this invention will become apparent from the description to follow, particularly when read in conjunction with the accompanying drawing.

SUMMARY OF THE INVENTION

In carrying out this invention, I provide an annular wall or flange which is secured and sealed by welding, directly to the top of the gas bottle. A collar near the top of the flange carries a seal ring and a complementary circular cover with depending annular rim slides down over the wall to engage the seal. A releasable tension band is tightened around the cover to fix the closure in firm, sealing position.

DESCRIPTION OF A PREFERRED EMBODIMENT

Figure 2:
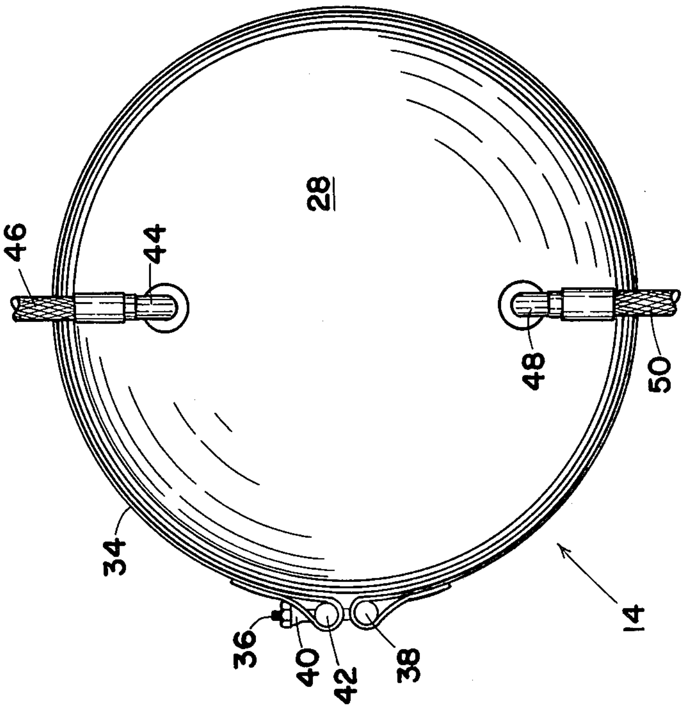
FIG. 2 is a plan view of the containment.
Figure 1:
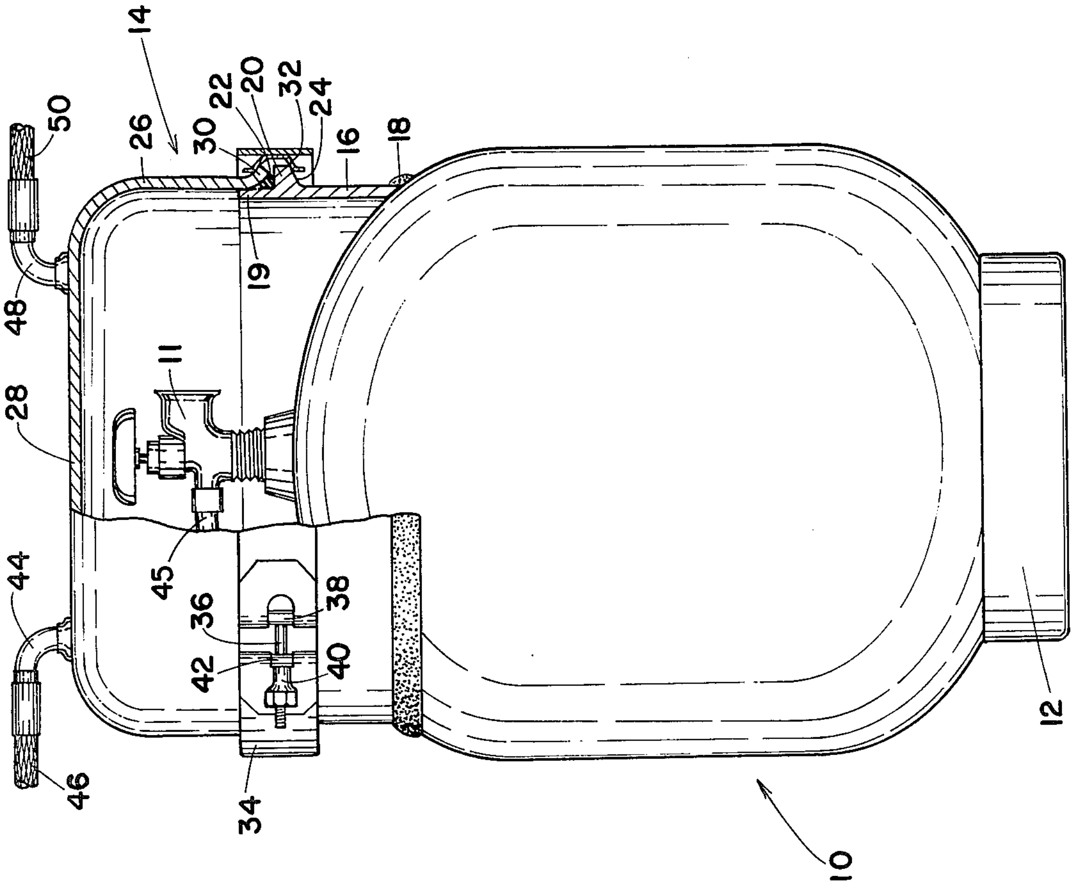
FIG. 1 is an elevation view partly broken away of a gas bottle with containment of this invention partly broken away.

Referring now to the drawing with greater particularly, there is shown a liquified petroleum gas (P) bottle 10, to which is welded a base 12 to enable it to stand erect, and on which is mounted the containment 14 of this invention.

The containment 14 comprises an upwardly directed annular wall or flange 16 which is secured directly to the cylinder 10 by means of a weldment 18 that provides a sealed, gas-tight joint. Encircling the flange 16 near the upper end 19 thereof is a collar 20 on which is carried a gasket or seal ring 22, such as an O-ring. The underside of the collar 20 is chamfered at 24 for a purpose to be hereinafter described.

Slidable over the upper end 19 of the flange 16 is an annular rim or side 26 of a circular top closure 28. An outturned lip 30 at the lower end of the rim 26 engages the O-ring 22 to form a gas-tight seal with the flange 16. A Vee clamp 32 carried on a flexible belt 34 engages the lip 30 and the chamfered underside 24 of the collar 20, so that when tightened to provide hoop tension, the lip 22 and collar 20 are drawn together to squeeze the O-ring 22 and ensure a gas-tight seal. A bolt 36 pivoted at 38 in one end of the belt 34 is engaged by a nut 40 on the other end 42, so that on tightening the nut 40 the ends 38 and 42 are drawn tightly together to apply the necessary hoop tension.

Opening from the top closure 28 is a fitting 44 which, as shown, is connected at 45 to the gas output valve 11 and carries a gas duct 46 to be connected to the appropriate appliance (not shown) and a second fitting 48 carries a venting duct 50 which may be directed to a suitable exhaust area, such as over the side of a vessel, to eliminate hazard of explosion.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A containment for a gas cylinder in use as a supply of gas to an appliance, with an outlet valve at one end of said cylinder, comprising:
   - an annular, generally coaxial wall on said one end of said cylinder surrounding said outlet valve;
   - a weldment securing said wall to said cylinder and sealing completely around and between said wall and cylinder;
   - a circular top closure with a depending annular rim adapted to seal on and around said annular wall;
   - a supply gas duct to be connected to said outlet valve and extending from said top closure;
   - an exhaust gas duct opening from said top closure;
   - a seal ring positioned between said rim and said wall; and
   - releasable means for securing said rim and wall together in sealed relationship.

2. The containment defined by claim 1 including:
   - an upwardly facing collar around said annular wall;
   - said seal ring being positioned on said collar; and
   - a lip around said annular rim adapted to engage said seal ring;
   - and wherein:
   - said releasable means comprises a belt to encircle said rim and annular wall, and conditioned when tightened to draw said lip and collar together;
   - and including:
   - complementary threaded means on the ends of said band to draw same together.

3. The containment defined by claim 2 including:
   - internal Vee surfaces around said belt; and
   - complementary converging surfaces on said lip and collar engageable by and pressed together by said Vee surfaces.

* * * * *